United States Patent

[11] 3,607,212

| [72] | Inventors | Gottfried Nettesheim<br>Wesseling;<br>Ernst Petzold, Grosskonigsdorf; Hermann<br>Pruckner, Wesseling, all of Germany |
|---|---|---|
| [21] | Appl. No. | 789,622 |
| [22] | Filed | Jan. 7, 1969 |
| [45] | Patented | Sept. 21, 1971 |
| [73] | Assignee | Union Rheimische Braunkohlen Kraflstoff<br>Aktiengesellschaft<br>Cologne, Germany |
| [32] | Priority | Feb. 2, 1968 |
| [33] | | Germany |
| [31] | | P 16 67 799.9 |

[54] A BROWN COAL FERTILIZER PRODUCT AND PROCESS FOR PREPARING SAME
3 Claims, No Drawings

[52] U.S. Cl. .................................................. 71/12, 71/24, 71/25, 71/26
[51] Int. Cl. .................................................. C05f 7/00, C05f 11/02
[50] Field of Search ........................................ 71/24, 12

[56] References Cited
UNITED STATES PATENTS

| 1,309,723 | 7/1919 | Earp-Thomas............... | 71/24 X |
| 1,890,459 | 12/1932 | Fluck et al. .................. | 71/24 X |
| 2,035,286 | 3/1936 | Wenzel......................... | 71/24 X |
| 3,075,836 | 1/1963 | Jackson........................ | 71/24 |

OTHER REFERENCES

Hackh's Chemical Dictionary, 3rd Edition, page 145— published by The Blakiston Co., Philadelphia— 1944— Copy in Patent Office Chemical Library

*Primary Examiner*—Samih N. Zaharna
*Assistant Examiner*—Bennett H. Levenson
*Attorney*—Connolly and Hutz ABSTRACT: Agents for improving the fertility of soil consisting of a mixture of brown coal and a material which is capable of being decomposed by bacteria such as α-cellulose-containing waste residues, sugar-containing residues, sawdust and sewage sludge.

A BROWN COAL FERTILIZER PRODUCT AND PROCESS FOR PREPARING SAME

This invention relates to a process for producing agents for improving the fertility of soil and agents produced thereby.

The use of brown coal as an agent for improving the fertility of soil has already been investigated with the result that with brown coal, in contrast to peat, an improvement of soil cannot be obtained, although such an improvement was to be expected because of the structure of the brown coal humic acids.

It has been discovered, in accord with the invention, that an agent for improving the fertility of soil can be obtained by adding to brown coal a small amount of a material which is capable of being decomposed by bacteria. Similar to peat, these materials provide better harvests. Materials which are capable of being decomposed by bacteria are waste products of the cellulose industry containing α-cellulose, e.g. so-called filter residues; sugar-containing waste products of the sugar industry, e.g. lime residue, and public waste waters, e.g. mud of those waters or sewage sludge. In general, mixtures containing up to 15 percent by weight are sufficient to obtain an agent which is equal to and frequently even more effective than a corresponding mixture of peat. However higher percentages of the material are sometimes useful.

The invention offers the possibility of replacing peat with a cheap product, available in sufficient quantities, whereas the reserves of economically obtainable peat are likely to be exhausted within a relatively short time.

Mixing brown coal with said materials can be carried out in any manner, e.g. in a hammer mill or a jaw crusher. High temperatures during mixing, however, should be avoided. In general temperatures up to about 50° C. are permissible. Under certain circumstances an admixture of lime, ammonia or potash can be useful for the neutralization of the humic acids of the brown coal. Furthermore, it is possible to admix various fertilizers. If necessary, a porous material such as peat may be added in order to loosen the somewhat compact structure of the brown coal.

EXAMPLE

Pot-tests with wheat as the experimental growing plant have been carried out in two test-series, under different rates of irrigation. In these tests, a dry climate (series A) was simulated by sprinkling to a water capacity of about 60 percent (sandy soil). By sprinkling to a water capacity of 70 percent and additionally by sprinkling during the period of growth once a week to a water capacity of 120 percent, a damp climate was simulated (series B). Except for the experiments with a lower rate of brown coal and with sewage sludge only, the amount of agent for improving fertility of soil, related to the dry substance was equal in all test series. In all series the following components served as fertilizer:

per pot: 1.2 g. N, 1.2 g. $P_2O_5$ and 2 g. $K_2O$

The fertility improving agents tested are:

| | water contents |
|---|---|
| Rhenish brown coal (RBK) | 58.6% |
| Peat | 74.8% |
| Cellulose-containing residue | **7.6% |
| Sugar-containing lime residue | 27.8% |
| Sawdust of spruces | 16.4% |
| Sewage sludge | 94.0% |

As can be seen from series A compared with the experiment carried out without adding an agent for improving soil fertility, peat delivers an increase in yield of about 5 percent, whereas the use of brown coal and sewage sludge, each added separately, results in distinctly less improvement. The combination according to the invention, however, shows improvement in all cases.

Series B, fundamentally, shows the same results. Peat provides an increase in yield of about 15 percent; brown coal alone brought only about 4 percent. When employing the combination according to the invention, the result is almost equal to the effect of peat. Only when adding sawdust was the improvement somewhat inferior.

| AGENT | YIELD OF WHEAT GRAIN | |
|---|---|---|
| | (dry basis) g. per pot | % weight |
| SERIES A | | |
| without | 43.1 | 100.0 |
| 163 g. of peat | 45.0 | 104.5 |
| 100 g. of brown coal | 41.8 | 97.0 |
| 95 g. of brown coal + 2.2 g. of α-cellulose-residue | 45.6 | 106.0 |
| 81 g. of brown coal + 11 g. of lime residue | 44.2 | 102.5 |
| 5 g. of sewage sludge | 42.0 | 97.5 |
| 95 g. of brown coal + 2 g. of sewage sludge* | 44.9 | 104.0 |
| 88 g. of brown coal + 5 g. of sewage sludge* | 46.0 | 107.0 |
| 76 g. of brown coal + 10 g. of sewage sludge | 45.4 | 105.5 |
| *(dry basis) | | |
| SERIES B | | |
| without | 39.7 | 100.0 |
| 163 g. of peat | 45.8 | 115.5 |
| 100 g. of brown coal | 41.4 | 104.5 |
| 95 g. of brown coal + 2.2 g. of α-cellulose-residue | 46.3 | 116.5 |
| 81 g. of brown coal + 11 g. of lime residue | 46.9 | 118.0 |
| 60 g. of brown coal + 23 g. of lime residue | 45.8 | 115.5 |
| 95 g. of brown coal + 2.4 g. of sawdust | 43.7 | 110.0 |
| 95 g. of brown coal + 2 g. of sewage sludge* | 45.7 | 115.0 |
| 88 g. of brown coal + 5 g. of sewage sludge* | 44.3 | 111.5 |
| 76 g. of brown coal + 10 g. of sewage sludge * | | |
| *(dry basis) | 44.6 | 112.5 |

What is claimed is:

1. A process for the production of agents which improve the fertility of soil which comprises intimately mixing, at temperatures up to about 50° C., brown coal and a minor amount up to 15 percent by weight of a material selected from the group consisting of α-cellulose-containing waste residues of the cellulose industry, sugar-containing residues of the sugar industry, sawdust and sewage sludge.

2. The process according to claim 1 wherein one or more fertilizers in small amounts are mixed with the brown coal and said material.

3. An agent for improving the fertility of the soil which comprises brown coal and a minor amount up to 15 percent by weight of a material selected from the group consisting of α-celulose-containing waste residues of the cellulose industry, sugar-containing residues of the sugar industry, sawdust and sewage sludge.